United States Patent
Yanagi et al.

(10) Patent No.: US 7,330,411 B2
(45) Date of Patent: Feb. 12, 2008

(54) OPTICAL INFORMATION STORING DEVICE, DATA PROCESSING CIRCUIT AND INFORMATION STORAGE MEDIUM

(75) Inventors: Shigenori Yanagi, Kawasaki (JP); Hiroshi Tani, Kawasaki (JP); Tetsuya Tsuji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 787 days.

(21) Appl. No.: 10/719,122

(22) Filed: Nov. 21, 2003

(65) Prior Publication Data

US 2004/0105371 A1    Jun. 3, 2004

Related U.S. Application Data

(63) Continuation of application No. PCT/JP01/04776, filed on Jun. 6, 2001.

(51) Int. Cl.
*G11B 7/00* (2006.01)
(52) U.S. Cl. ............... 369/53.21; 369/59.25; 369/275.3
(58) Field of Classification Search ............... 369/47.1, 369/47.15, 47.27, 275.3, 59.25, 53.22, 53.21, 369/44.26
See application file for complete search history.

(56) References Cited

U.S. PATENT DOCUMENTS 5,014,274 A    5/1991  Higurashi et al.
5,463,606 A    10/1995 Kaneko et al.
6,526,010 B1 *  2/2003  Morioka et al. ......... 369/47.15

FOREIGN PATENT DOCUMENTS

| JP | 60-076061 | 4/1985 |
| JP | 01-260675 | 10/1989 |
| JP | 06-195878 | 7/1994 |
| JP | 07-161139 | 6/1995 |
| JP | 08-055343 | 2/1996 |
| JP | 11-238305 | 8/1999 |
| JP | 2000-105672 | 4/2000 |
| JP | 2000-252976 | 9/2000 |
| JP | 2000-285611 | 10/2000 |
| JP | 2001-143270 | 5/2001 |

* cited by examiner

*Primary Examiner*—Nabil Hindi
(74) *Attorney, Agent, or Firm*—Greer, Burns & Crain, Ltd.

(57) ABSTRACT

The present invention aims at providing an inexpensive optical information storing device that produces reduced cross talk. An optical information storing device has a cyclic data output circuit 14_1 that outputs cyclic data in which values are repeated every 5 bytes, and an EXOR circuit 14_2 that calculates the exclusive-OR (EXOR) of recording data input thereto via a buffer 14_5 and the cyclic data and inputs the calculation result to an RLL modulation circuit 14_3 as data to be recorded.

19 Claims, 4 Drawing Sheets

OPTICAL INFORMATION STORING DEVICE, DATA PROCESSING CIRCUIT AND INFORMATION STORAGE MEDIUM

This is a continuation of International PCT Application No. PCT/JP01/04776 filed Jun. 6, 2001.

TECHNICAL FIELD

The present invention relates to an optical information storing device that records or reads information onto or from an information storage medium that stores information in the form of an optically readable mark, and a data processing circuit integrated into the optical information storing device, and an information storage medium.

BACKGROUND ART

Conventionally, optical information storage media, such as CD, CD-ROM, CD-R, DVD, PD, MO and MD, have been widely used for mass storage of audio signals or image signals. In particular, magneto-optical storage media and phase change storage media are attracting attention as rewritable high-density storage media, and research and development thereof is being increasingly conducted for higher density. Besides, research and development on the optical information storing devices that access information stored in such optical information storage media is being increasingly conducted.

In general, an optical information storage medium has the shape of a disc, a multi-helical track or a large number of concentric tracks are provided thereon in parallel with each other, and information is stored in the tracks in the form of optically readable marks. In order to increase the recording density of the optical information storage medium, there can be adopted one of two approaches, that is, shortening the track pitch or increasing the track recording density. Both of the approaches can be implemented if the wavelength of a semiconductor laser used for recording and reproduction is shortened. However, it will be take some time to provide an inexpensive semiconductor laser that continuously emits light of short wavelengths, such as blue or green light, stably at room temperature for a long time.

Under such circumstances, a technique of substantially increasing the track recording density using a semiconductor laser of a currently possible wavelength is being searched for. For example, concerning the magneto-optical storage media, there is proposed a technique of applying a reproduction magnetic field to limit the reproduction target area to an area smaller than the laser spot (referred to as magnetic super resolution).

On the other hand, as a technique of shortening the track pitch using a semiconductor laser of a currently possible wavelength, there is proposed a technique referred to as land and groove recording, in which a storage medium has grooves and lands alternately arranged, and both the grooves and the lands are used as tracks for recording information. The land and groove recording is expected to realize substantial shortening of the track pitch.

If the track pitch is substantially shortened, substantial improvement of recording density can be expected. However, there rises a worry that cross talk between adjacent tracks increases, and it is desirable to reduce cross talk.

As a recording method suitable for high density information recording, a mark edge recording method is known. In information recording according to the mark edge recording method, in general, RLL (run-length limited) modulation, referred to as RLL(1, 7), is performed on a bit data string representing the information, and a mark depending on the modulated bit data string is recorded on the optical information storage medium.

It is known that, according to such a recording method, if particular cyclic data is recorded, a mark pattern having repetition of long marks and short spaces or a mark pattern having repetition of short marks and long spaces occurs on the optical information storage medium (hereinafter, these mark patterns will be referred to as a worst mark pattern). In addition, it is also known that such worst mark patterns provide particularly intense cross talk. In order to reduce cross talk, there is a need for a technique of avoiding occurrence of such worst mark patterns.

As a technique of avoiding occurrence of the worst mark patterns described above, for example, there is proposed a technique of adding a pseudorandom number to a bit data string representing information to be recorded, thereby preventing occurrence of the particular cyclic data described above. However, this technique has a problem of high cost because it is essential that a bulk circuit that produces pseudorandom numbers is integrated into the optical information storing device. In addition, there is no practical technique of avoiding occurrence of the worst mark patterns described above other than the technique of using pseudorandom numbers.

Such a problem becomes significant when the land and groove recording method is adopted. Even if the land and groove recording method is not adopted, however, the same problem is generally encountered when the track pitch of an optical information storage medium is desirably shortened.

DISCLOSURE OF THE INVENTION

In view of such circumstances, an object of the present invention is to provide an inexpensive optical information storing device that produces reduced cross talk, a data processing circuit that realizes such an optical information storing device, and an information storage medium that produces reduced cross talk. Such an optical information storing device and the like allows information to be stored with higher recording density.

A first optical information storing device according to the present invention that attains the object described above has:

a data recording section that receives arbitrary recording data and records the recording data in a predetermined information storage medium in the form of optically-readable marks;

a cyclic data output section that outputs predetermined cyclic data in which values are repeated every N bytes (N being an integer larger than 3, except for multiples of 3); and a logic operation section that receives the cyclic data output from the cyclic data output section and arbitrary original data, performs a predetermined logic operation on the cyclic data and the original data and inputs data resulting from the logic operation to the data recording section as the recording data.

In addition, a second optical information storing device according to the present invention that attains the object described above has: a data reading section that reads data recorded in a predetermined information storage medium in the form of optically-readable marks;

a cyclic data output section that outputs predetermined cyclic data in which values are repeated every N bytes (N being an integer larger than 3, except for multiples of 3); and an inverse operation section that performs an inverse operation of a predetermined logic operation on the data read by the data reading section and the cyclic data output from the cyclic data output section and outputs data resulting from the inverse operation.

The "logic operation" may be the exclusive-OR or exclusive-NOR. Alternatively, it may be a reversible logic operation defined as one using a set of plural bits as an operation unit.

The worst mark pattern described above occurs when particular 3-byte cyclic data is modulated using an RLL(1, 7) code. According to the present invention, rather than RLL-modulating the original data, data resulting from a logic operation performed on the original data and cyclic data in which values are repeated every N bytes is RLL-modulated and recorded in a medium. Thus, the data immediately before RLL modulation is unlikely to be the 3-byte cyclic data described above, and therefore, occurrence of the worst mark pattern described above can be adequately avoided. When reading recorded information, an inverse operation using the same cyclic data as that used in recording is performed on data which is RLL-demodulated, thereby reconstructing the original data. In addition, the cyclic data output section and the operation section can be implemented as a small-size circuit or element, and therefore, the optical information storing device according to the present invention can be implemented at a low cost.

The first optical information storing device according to the present invention is a device that has an information recording function, and the second optical information storing device according to the present invention is a device that has an information reading function. In the following description, the first and second optical information storing devices will sometimes be collectively referred to as the optical information storing device according to the present invention.

In the first optical information storing device according to the present invention, the logic operation section preferably uses the exclusive-OR as the logic operation.

In the second optical information storing device according to the present invention, the inverse operation section preferably uses the exclusive-OR as the inverse operation.

Since the logic operation and the inverse operation are the same exclusive-OR, in a device that serves as both the first and second optical information storing devices according to the invention, a single circuit can double the logic operation section and the inverse operation section. Thus, the whole circuit size can be reduced, and an inexpensive optical information storing device can be provided.

As the repetition unit of values of the cyclic data becomes larger, the effect of avoiding occurrence of the worst mark pattern increases. However, the circuit size of the cyclic data output section and, therefore, the cost also increase. Therefore, in the optical information storing device according to the present invention, it is preferable that the cyclic data output section outputs cyclic data in which values are repeated every 4 to 7 bytes, and it is particularly preferable that the cyclic data output section outputs predetermined cyclic data in which values are repeated every 5 bytes.

In the optical information storing device according to the present invention, the cyclic data output section has a register that stores N bytes of data which are a unit of the cyclic data and a cyclic data generator that generates the cyclic data repeatedly using the N bytes of data stored in the register.

The optical information storing device having the cyclic data output section thus configured is highly flexible because it can change cyclic data by rewriting data stored in the register on a software basis and select among from plural pieces of cyclic data as required.

If the predetermined information storage medium is a medium having plural tracks in which the marks are to be recorded arranged in parallel with each other, the cyclic data output section of the optical information storing device according to the present invention desirably outputs different cyclic data for each track.

Furthermore, if the predetermined information storage medium is a medium having plural tracks in which the marks are to be recorded arranged in parallel with each other, and the tracks are each divided into plural sectors, the cyclic data output section of the optical information storing device according to the present invention desirably outputs different cyclic data for each sector.

As the recording density of the information storage medium becomes higher, the possibility that, when reading information from a desired track or sector, information recorded in an adjacent track or sector is erroneously read becomes higher. It is desirable that, when information is erroneously read in this way, the error is distinctly identified.

In the optical information storing device having the cyclic data output section that outputs different cyclic data for each track or sector, information is adequately obtained only when the same cyclic data as that used in recording in each track or sector is used in reading, and if different cyclic data is used, a distinct read error occurs. Thus, if the information recorded in a track or sector other than the desired track or sector is erroneously read, it is distinctly determined that erroneous reading occurs.

If the predetermined information storage medium is a medium having plural tracks in which the marks are to be recorded arranged in parallel with each other, and the plural tracks are assigned respective track numbers for discriminating among the tracks, the cyclic data output section of the optical information storing device according to the present invention preferably generates the cyclic data based on bit values of predetermined bits including a least significant bit in bit data representing the track number and outputs the cyclic data.

If the predetermined information storage medium is a medium having plural tracks in which the marks are to be recorded arranged in parallel with each other, the plural tracks are each divided into plural sectors, the plural tracks are assigned respective track numbers for discriminating among the tracks, and the plural sectors are assigned respective sector numbers for discriminating among the sectors, the cyclic data output section of the optical information storing device according to the present invention generates the cyclic data based on bit values of predetermined bits including a least significant bit in bit data representing the track number and bit values of predetermined bits including a least significant bit in bit data representing the sector number and outputs the cyclic data.

By using the bit data representing a track number or sector number, different cyclic data is readily created for each track or sector. While the track numbers or sector numbers themselves are not suitable for use as cyclic data in many cases, bit data representing the track numbers or sector numbers can be processed to create cyclic data suitable for the object of the present invention.

The optical information storing device according the present invention desirably has a nullifying section that nullifies the logic operation or inverse operation by the logic operation section or inverse operation section when performing a read/write test of the marks for the information storage medium.

The optical information storing device according the present invention desirably has a nullifying section that nullifies the logic operation or inverse operation by the logic operation section or inverse operation section when performing a failure check for the predetermined information storage medium.

In the read/write test of the marks and the failure check, it is necessary that a predetermined mark pattern suitable for the test and the like is recorded in the medium. Therefore, it is desirable that the functions of the logic operation section and the inverse operation section are nullified to record predetermined test data that produces the predetermined mark pattern.

If the predetermined information storage medium has a security area in which security information is recorded and an ordinary area in which ordinary information excluding the security information is recorded, the cyclic data output section of the optical information storing device according to the present invention outputs different cyclic data for the security area and the ordinary area. Thus, security for information is improved.

In addition, in terms of improvement of security, it is preferable that the cyclic data output section generates the cyclic data based on a data value of a predetermined bit in security bit data and outputs the cyclic data.

A first data processing circuit according to the present invention that attains the object described above is a data processing circuit that is incorporated in an optical information storing device and performs data processing, the optical information storing device having a data recording section that receives arbitrary recording data and records the recording data in a predetermined information storage medium in the form of optically-readable marks, the first data processing circuit having:

a cyclic data output section that outputs predetermined cyclic data in which values are repeated every N bytes (N being an integer larger than 3, except for multiples of 3); and a logic operation section that receives the cyclic data output from the cyclic data output section and arbitrary original data, performs a predetermined logic operation on the cyclic data and the original data and inputs data resulting from the logic operation to the data recording section as the recording data.

In addition, a second data processing circuit according to the present invention that attains the object described above is a data processing circuit that is a data processing circuit that is incorporated in an optical information storing device and performs data processing, the optical information storing device having a data reading section that reads data recorded in a predetermined information storage medium in the form of optically-readable marks, the second data processing circuit having:

a cyclic data output section that outputs predetermined cyclic data in which values are repeated every N bytes (N being an integer larger than 3, except for multiples of 3); and an inverse operation section that performs an inverse operation of a predetermined logic operation on the data read by the data reading section and the cyclic data output from the cyclic data output section and outputs data resulting from the inverse operation.

Furthermore, an information storage medium according to the present invention that attains the object described above is an information storage medium in which information is recorded therein in the form of optically-readable marks, wherein data resulting from a predetermined logic operation performed on digital data representing the information and predetermined cyclic data in which values are repeated every N bytes (N being an integer larger than 3, except for multiples of 3) is converted into a mark and recorded.

Only basic configurations of the data processing circuit and the information storage medium according to the present invention are shown herein. However, this is simply intended to avoid overlaps, and the data processing circuit and the information storage medium according to the present invention are not limited to those of the basic configurations described above, and the present invention includes data processing circuits and information storage media having various configurations available for the configurations of the optical information storing device described above.

BEST MODE FOR CARRYING OUT THE INVENTION

Now, an embodiment of the present invention will be described.

Figure 1:
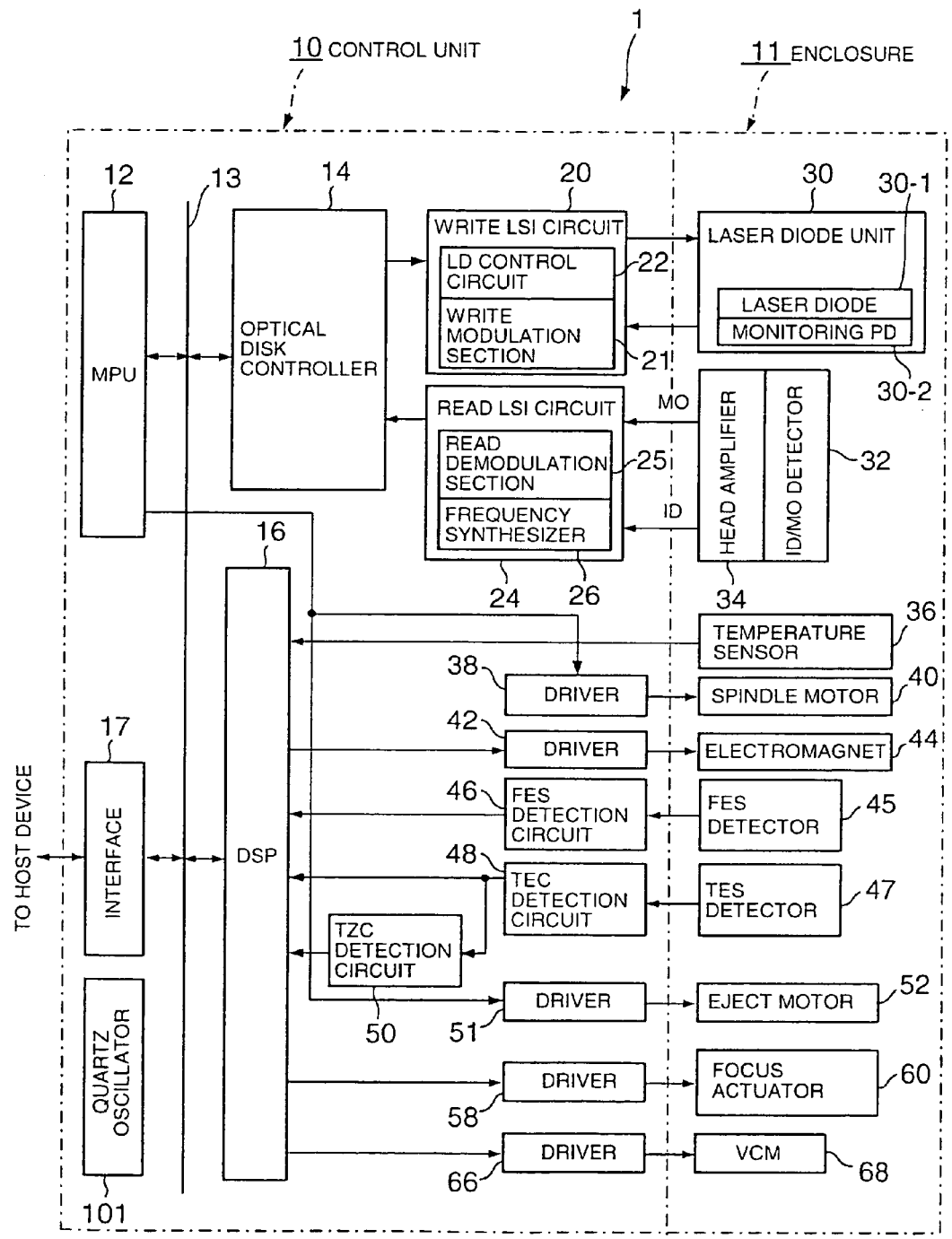
FIG. 1 shows an optical information storing device according to an embodiment of the present invention.

FIG. 1 shows an optical information storing device according to an embodiment of the present invention.

In this drawing, the optical information storing device according to the present embodiment is a magneto-optical (MO) disc device 1 using a land and groove recording method.

Generally speaking, the MO disc device 1 has an enclosure 11 and a control unit 10. The enclosure 11 accesses a magneto-optical disc (MO disc), which is an example of an information storage medium according to the present invention, inserted therein together with a cartridge containing the MO disc. The control unit 10 controls the operation of the enclosure 11.

The MO disc inserted in the enclosure 11 is held by a spindle motor 40. The spindle motor 40 receives a driving current depending on a driving control signal generated by a micro processor unit (MPU) 12 from a spindle motor driver 38 and rotationally drives the MO disc or stops rotation of the MO disc. The MPU 12 controls the whole MO disc device 1 to execute a processing operation in response to a processing request from a host device or the like.

The enclosure 11 has an eject motor 52 provided therein. When an eject button (not shown) is pushed, the MPU 12 generates an eject signal, the eject signal is input to an eject motor driver 51, and the eject motor driver 51 supplies a driving current to the eject motor 52. The eject motor 52 having received the driving current ejects the MO disc to the outside of the MO disc device 1.

The enclosure 11 is provided with a laser diode unit 30. When reproducing information, a laser diode 30_1 of the laser diode unit 30 emits laser light of a predetermined intensity. The intensity of the laser light is controlled by a monitor photodiode 30_2 and a laser diode control circuit 22. The laser light is applied onto the MO disc after passing through a focusing optical system (not shown), and then, reflection light associated with the information recorded on the MO disc occurs. An ID/MO detector 32 receives the reflection light and detects an ID signal and an MO signal. The ID signal and the MO signal are amplified by a head amplifier 34, and the amplified signals are input to a read LSI circuit 24 and demodulated by a read demodulation circuit 25, thereby being converted into binary reproduction data, the read demodulation circuit 25 being synchronized with a periodic signal generated by a frequency synthesizer 26 changing a fundamental periodic signal of a quartz oscillator. The reproduction data represents a mark pattern itself recorded on the MO disc. The reproduction data is subjected to demodulation associated with RLL modulation (RLL demodulation) or the like in an optical disc controller 14, thereby being converted into reproduction information data capable of being handled by a computer as recorded information. The reproduction information data is sent to a host device, such as a personal computer, via a bus 13 and an interface 17.

On the other hand, when recording information, recording information data is transmitted to the optical disc controller 14 via the interface 17 and the bus 13. The recording information data is subjected to RLL modulation or the like in the optical disc controller 14, thereby being converted into binary recording data representing a mark pattern on an MO disc. The recording data is input to a write LSI circuit 20. In addition, if formatting the MO disc, the optical disc controller 14 generates format data representing a predetermined mark pattern and inputs the same to the write LSI circuit 20.

The recording data and the format data are modulated by a write modulation section 21 in the write LSI circuit 20, thereby being converted into a write signal representing the intensity of laser light or the like. The write signal is input to the laser diode unit 30, and the laser diode 31_1 emits laser light associated with the write signal.

In the information recording and the disc formatting, the MPU 12 generates a magnetic field generation signal and inputs the same to a digital signal processor (DSP) 16. The DSP 16 controls a magnetic head driver 42 in response to the magnetic field generation signal and an output signal of a temperature sensor 36. The magnetic head driver 42 supplies a current to an electromagnet of a magnetic head 44, and thus, a recording magnetic field is produced over the MO disc. The recording magnetic field and the laser light associated with the write signal cooperate to record information onto the MO disc or to format the MO disc.

In addition, the MO disc device 1 is provided with a voice coil motor (VCM) 68, which receives a driving current from a voice coil motor driver 66 and moves an optical head along the surface of the MO disc, the optical head having the focusing optical system, the laser diode unit 30 and the like mounted thereon. The voice coil motor driver 66 is controlled by the DSP 16 using a tracking error signal, a tracking zero cross and a seek signal which is generated by the MPU 12. The tracking error signal and the tracking zero cross are detected by a tracking error signal (TES) detection circuit 48 and a tracking zero cross (TZC) detection circuit 50 from a detection signal detected by a tracking error signal (TES) detector 47.

Furthermore, the MO disc device 1 is provided with a focus actuator 60, which receives a driving current from a focus actuator driver 58 to drive the focusing optical system. The focus actuator driver 58 is controlled by the DSP 16 using a focus error signal (FES) detected by an FES detection circuit 46 from a detection signal detected by a focus error signal (FES) photodetector 45.

Now, the optical disc controller will be described in detail.

Figure 2:
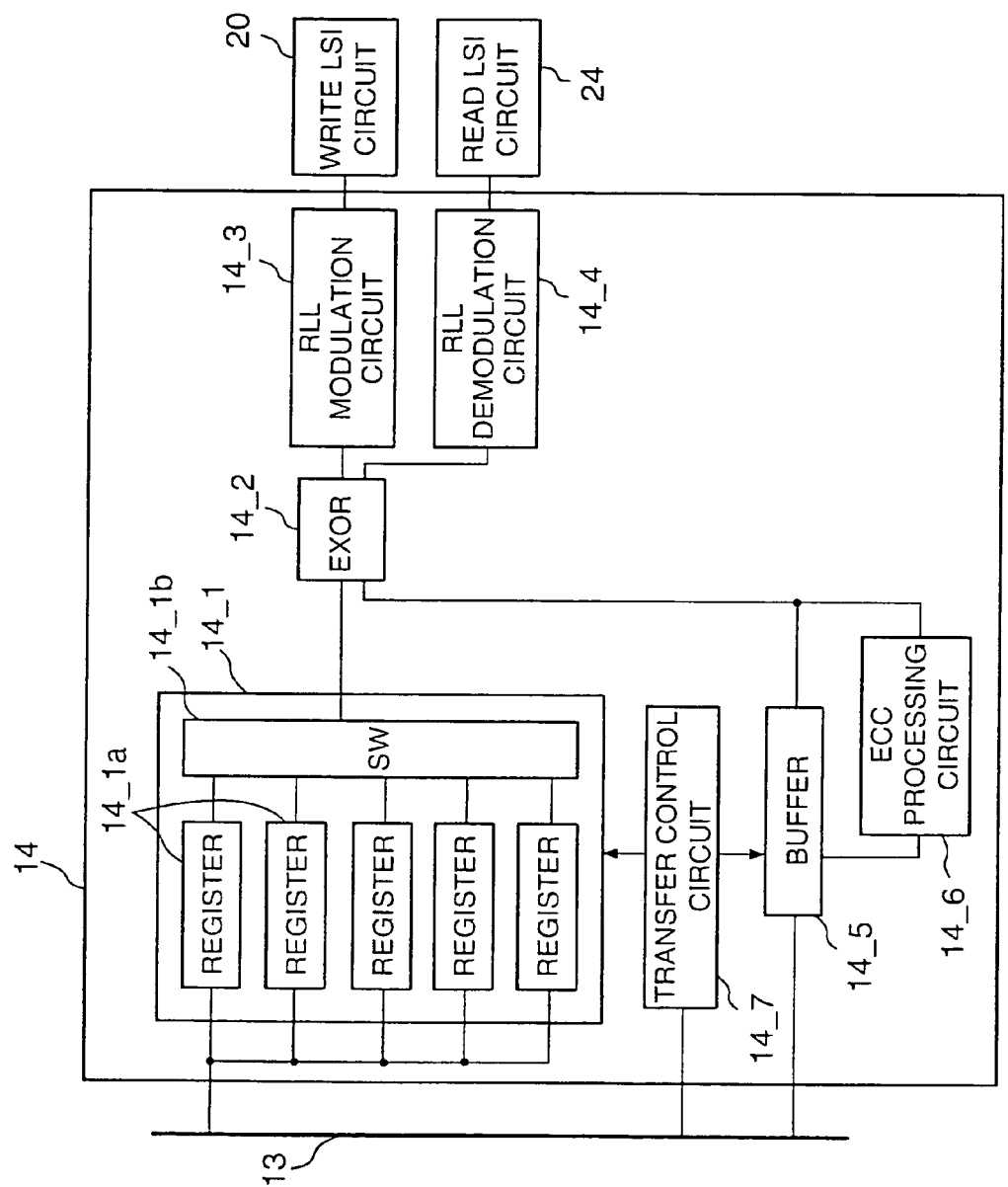
FIG. 2 is a detailed diagram of an optical disc controller.

FIG. 2 is a detailed diagram of the optical disc controller.

The optical disc controller 14 has a cyclic data output circuit 14_1, which is an example of a cyclic data output section according to the present invention, an EXOR circuit 14_2, which doubles as an example of a modulation operation section according to the present invention and an example of a demodulation operation section according to the present invention, an RLL modulation circuit 14_3 and an RLL demodulation circuit 14_4. The RLL modulation circuit 14_3 and the RLL demodulation circuit 14_4 constitute a data recording section and a data reading section in combination with the write LSI circuit 20 and the read LSI circuit 24, respectively.

The recording information data input to the optical disc controller via the bus 13 is stored temporarily in a buffer 14_5. Then, an error correction code (ECC) processing circuit 14_6 adds an error correction code to the recording information data and input the data to the EXOR circuit 14_2. To the EXOR circuit 14_2, cyclic data output from the cyclic data output circuit 14_1 is also input. The EXOR circuit 14_2 calculates the exclusive-OR (EXOR) of the recording data (with the ECC) and the cyclic data. If the bit value of the cyclic data is 1, the exclusive-OR calculation causes the value of an associated bit of the recording information data to be inverted. If the bit value of the cyclic data is 0, the value of the associated bit of the recording information data is not changed.

The result of the calculation by the EXOR circuit 14_2 is input to the RLL modulation circuit 14_3 and subjected to RLL modulation and then is input to the write LSI circuit 20. In this example, cyclic data having a cycle of 5 bytes is used. Therefore, even if the recording information data is one having values repeated every 3 bytes, the calculation result of the EXOR circuit 14_2 is data having values repeated every 15 bytes. In addition, the possibility that the calculation result of the EXOR circuit 14_2 happens to be a cyclic data having a cycle of 3 bytes is low. Therefore, the possibility that the calculation result becomes the above-described particular cyclic data which provides the worst mark pattern which causes significant cross talk is extremely low, and cross talk is reduced effectively. The calculation of the exclusive-OR by the EXOR circuit 14_2 serves to disturb the repetition of values every 3 bytes. Thus, performing the calculation on data will be sometimes referred to as scrambling hereinafter. Besides, calculation of the exclusive-OR in information reproduction is to reconstruct the data disturbed in information recording. In the following, the calculation of the exclusive-OR in information reproduction is not distinguished from the calculation of the exclusive-OR in information recording, and both of them will be sometimes referred to as scrambling.

When reproducing information, the reverse procedure of the procedure described above is performed. Specifically, when reproducing information, reproduction data obtained from the read LSI circuit 24 is subjected to RLL demodulation in the RLL demodulation circuit 14_4, and then, the EXOR circuit 14_2 calculates the exclusive-OR of the reproduction data and the same cyclic data as that used in information recording. By the calculation of the exclusive-OR, the original data at the time of information recording is reconstructed and stored in the buffer 14_5. The reconstructed data is then checked for error by the ECC processing circuit 14_6 and, then, is output as the reproduction information data described above.

MO discs are calcified into plural types according to capacity, ability of overwriting, recording method (such as MSR method) or the like, and the MO disc device 1 is available for such plural types of MO discs. When an MO disc is inserted into the enclosure 11, the MPU 12 performs control to determine the type of the MO disc in an initial processing stage by reading data of a predetermined control information area of the MO disc, measuring the intervals between header areas provided on the MO disc or detecting the cartridge of the MO disc by a detection sensor. In the present embodiment, if the MO disc is determined to be a low density medium having a capacity of 120 MB to 1.3 GB, the scrambling described above is nullified, and if the MO disc is determined to be a high density medium having a capacity of 2.3 GB or higher, the scrambling described above is validated. For the sake of convenience of description, the following description will be made assuming that the MO disc is determined to be a high density medium having a capacity of 2.3 GB or higher.

A transfer control circuit 14_7 shown in FIG. 2 causes the cyclic output circuit 14_1 and the buffer 14_5 to transfer data at a high transfer rate in response to an instruction from the MPU.

The cyclic data output circuit 14_1 is a small-size circuit composed of 5 registers 14_1a and one switch 14_1b. The EXOR circuit 14_2 is a small circuit element.

The 5 registers 14_1a of the cyclic data output circuit 14_1 are each to store 1-byte data input thereto from the MPU 12 via the bus 13, and the 5-byte data stored in the 5 registers 14_1a is a unit of the cyclic data. The switch 14_1b serves to cause the 5 registers 14_1a to sequentially output data and is an example of a cyclic data generator according to the present invention.

Now, data stored in the 5 registers 14_1a will be described.

TABLE 1

|  | bit7 | bit6 | Bit5 | bit4 | bit3 | bit2 | bit1 | bit0 |
|---|---|---|---|---|---|---|---|---|
| Byte1 | T0 | T1 | T2 | T3 | T4 | S0 | S1 | L |
| Byte2 | *T0 | *T1 | *T2 | *T3 | *T4 | *S0 | *S1 | L |
| Byte3 | T5 | T6 | T7 | T8 | T9 | S2 | S3 | L |
| Byte4 | *T5 | *T6 | *T7 | *T8 | *T9 | *S2 | *S3 | L |
| Byte5 | T10 | T11 | T12 | T13 | T14 | S4 | S5 | L |

This Table 1 shows an example of data input from the MPU to the 5 registers 14_1a, in which one column is assigned to one bit of data. One byte of data shown in one row in Table 1 is stored in one register. When the data is output, it is sequentially output on a row by row basis starting from data in the row "byte 1" and the column "bit 0". Following data in the row "byte 1" and the column "bit 7", data in the row "byte 2" and the column "bit 0" is output. Then, once data in the row "byte 5" and the column "bit 7" is output, the sequential data output is repeated staring from the data in the row "byte 1" and the column "bit 0".

Data represented by a combination of a symbol "T" and a number n denotes an n-th bit in bit data representing a track number. Besides, data represented by a combination of a symbol "S" and a number n denotes an n-th bit in bit data representing a sector number. Furthermore, a symbol "*" means inversion of a data value. For example, if the value of data "T1" is "1", the value of data "*T1" is "0". In the present embodiment, the data shown in Table 1 is input by the MPU to the registers each time the track or sector to be accessed changes.

In the present embodiment, the land and groove recording is adopted, and sequential numbers are used as track numbers for lands and track numbers for grooves. Therefore, the tracks on a land and a groove assigned the same track number are adjacent to one another. Thus, in the present embodiment, in order for cyclic data of adjacent tracks to be different from one another even if the adjacent tracks have the same track number, a discrimination bit denoted by a symbol "L" in the column "bit 0" in Table 1 is used. When accessing a land, the discrimination bit is set to a value "1", and when accessing a groove, the discrimination bit is set to a value "0". The variation in cyclic data due to the discrimination bit is only 1 bit in 5 bytes. However, if data of a track adjacent to the track to be accessed is read by mistake, the 1-bit variation is accumulated to cause a distinct reproduction error.

While accessing a sector, the MPU creates the data shown in Table 1 using the track number, the sector number and the discrimination bit of the next access target. When the access target is changed, the MPU inputs the data for the next access target to the registers 14_1a. Thus, the time required to create the data shown in Table 1 is saved, and the total access time is shortened.

The track number, the sector number, the discrimination bit and the like are previously recorded, in the form of concave and convex pits, in a header area provided in each sector of the information storage medium. When recording information, these pieces of information recorded in the header area are read to determine whether the laser light is properly applied to a desired access target or not, and then, information recording is performed. Thus, if the access speed is not so fast, the track number or the like read in this way may be used to create the data shown in Table 1 and use the data for scrambling. Furthermore, when reproducing information, the information recorded in the header area may be read to create the data shown in Table 1.

Since the information recorded in the header area is used in this way, the cyclic data at the time of recording and the cyclic data at the time of reproduction coincide with each other, and thus, the cyclic data are associated with each other.

In Table 1 described above, a combination of a symbol and a numeric value that defines the bit data indicated in any column differs from combinations of a symbol and a numeric value that define the bit data output following and preceding the bit data. On the other hand, cyclic data may be contemplated in which plural pieces of bit data defined in the same way are output sequentially. Empirically, in 5-byte data, if 13 or more bit pairs are defined in the same way, the effect of reducing cross talk is significant, and if 3 or more successive bits are defined in the same way, the effect of reducing cross talk is reduced.

The optical information storing devices including the MO disc device are used to check information storage media for failure during production of the information storage media. In such failure checking, for a higher checking precision, a predetermined mark pattern which is susceptible to a failure is desirably used. In addition, in this failure checking, the same mark pattern is desirably used for all the sectors in order to provide uniform checking precision for the sectors. Thus, conventionally, checking data that produces the above-described predetermined mark pattern has been used for all the sectors.

Furthermore, for example, the MO disc device or the like that is available for a 3.5-inch MO disc having a capacity of 540 MB or more has incorporated therein a function of performing a read/write test for optimizing the laser power in response to a variation of the operational environment or a type of the medium used. The read/write test is an operation in which test patterns are recorded while varying the write power, the test patterns are read to find a write power that provides an error rate equal to or lower than a prescribed value, and the found write power is determined as a write power used in a normal operation. Conventionally, for a higher read/write test precision, a mark pattern for which the error rate during data reading varies significantly reflecting the variation of the write power has been chosen as the test pattern, and such a test pattern that produces the mark pattern has been used.

In view of such circumstances, in the failure checking and the read/write test, it is desirable that the check data and the test data described above are recorded after being subjected to the conventional RLL modulation. Thus, in the present embodiment, there is provided a mechanism that switches between a scrambling valid state and a scrambling nullified state in response to the type of operation.

Figure 3:
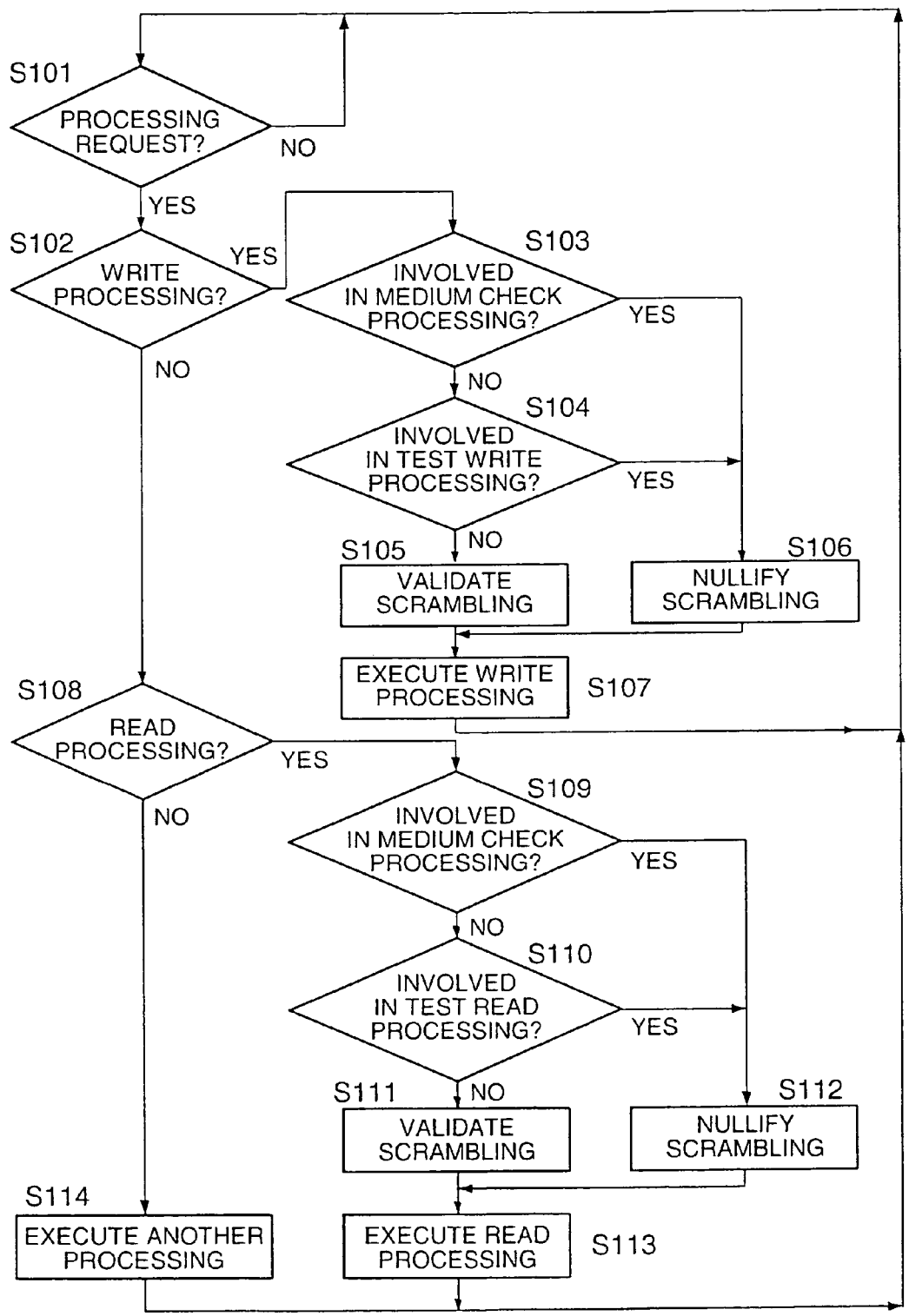
FIG. 3 is a flow chart illustrating an operation of switching between a scrambling valid state and a scrambling nullified state.

FIG. 3 is a flow chart illustrating an operation of switching between the scrambling valid state and the scrambling nullified state.

The flow chart in FIG. 3 shows a part of the operation of the MPU 12 shown in FIG. 1. As described above, the MPU 12 executes a processing operation in response to a processing request from a host device or the like.

In step S101 in FIG. 3, the MPU 12 is in a standby state waiting for a processing request. When the MPU 12 receives a processing request, it first determines whether the requested processing is a write processing or not (step S102). If the write processing is requested, then, it is determined whether the write processing is one involved in a failure check processing or test write processing for a medium (step S103, step S104). If it is determined that the write processing is a normal write operation, which is not involved in either the failure check processing or test write processing for a medium, the process continues to step S105, in which scrambling is validated and data illustrated in Table 1 is input to the cyclic data output circuit 14_1 shown in FIG. 2. Then, the write processing is executed using cyclic data in accordance with the data (step S107), and the MPU 12 enters again the standby state waiting for a processing request (step S101).

If it is determined that the requested write processing is a failure check processing for a medium in step S103, or if it is determined that the requested write processing is a test write processing for a medium in step S104, 5 bytes of value "0" are input to the cyclic data output circuit 14_1 shown in FIG. 2, and thus, scrambling is substantially nullified (step S106). That is, the MPU 12 is an example of a nullifying section according to the present invention. When scrambling is nullified, in this way, the write processing is executed (step S107), and the MPU 12 enters again the standby state waiting for a processing request (step S101).

If the processing requested by a host device or the like is a read processing ("yes" in step S108), as in the above described steps S103 to S107, it is determined whether the requested read processing is a read processing involved in a failure check processing or test read processing for a medium (step S109, step S110), scrambling is validated or nullified according to the determination result (step S111, step S112), and then, the read processing is executed (step S113). Then, the operation continues back to the standby state waiting for a processing request (step S101).

If the processing requested by the host device or the like is neither the write processing nor the read processing, another processing meeting the request is executed (step S114), and then, the process returns to the standby state waiting for a processing request (step S101).

Through such an operation, adequate switching between the scrambling valid state and the scrambling nullified state is attained.

An operation similar to this operation is executed when switching between the scrambling valid state and the scrambling nullified state is conducted in response to the result of discrimination of the type of the MO disc described above.

Now, arrangement of the scrambling described above with the aim of improving security will be proposed.

There is proposed an information recording medium and an optical information storing device that enable access restriction using security information, such as an medium ID, which is a number specific to each information recording medium, a password and individual information (name, address, telephone number, authentication number or the like) which vary from user to user, or a device ID, which is a number specific to each optical information storing device.

In addition, concerning the information recording medium and the optical information storing device, there is a proposal that the medium ID, the password, the individual information, the device ID and the like are recorded in a security area provided on the information recording medium. The security area is defined as a region for which free access by a user or host device is prohibited. When an instruction for setting an access restriction is sent from a host device to the optical information storing device, the MPU or the like in the optical information storing device activates a security program to execute access to the security area.

Besides the security area, a user area, to which a user or host device can freely access, is provided separately.

If the access restriction is set, when accessing the information recording medium including the user area, the optical information storing device requests a password or the like from a user or host device, and the user enters the password or the like. If the entered password or the like and the password or the like recorded in the security area coincide with each other, access to the information recording medium is permitted, and if they do not coincide with each other, there is imposed a restriction which prohibits writing (write access) and permits only reading (read access), a restriction which prohibits both reading and writing (read access and write access) or the like. Depending on the processing requested by the host device, an error message indicating that accessing is prohibited may be sent to the host device.

For access restriction, approaches disclosed in Japanese Patent Laid-Open Nos. 11-213551, 11-238306 and 11-265544 can be adopted.

As described above, different types of information are recorded on the security area and the user area, and thus, different data reading methods are desirably used for the security area and the user area.

According to the present embodiment, there is provided a function of selecting different cyclic data for the security area and the user area when an access restriction is applied to the information recording medium (MO disc) or when an MO disc to which an access restriction is applied is to be accessed. If no access restriction is imposed, only the cyclic data in which data shown in Table 1 is repeated is used.

Figure 4:
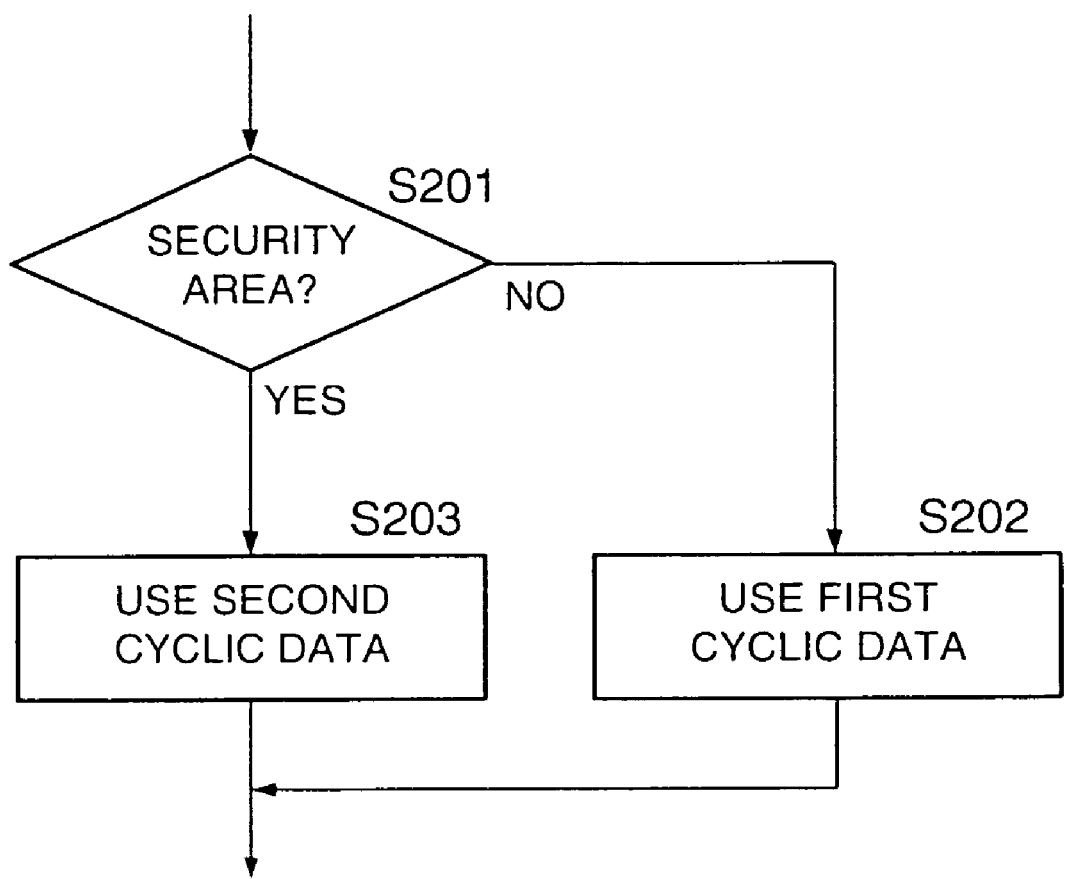
FIG. 4 is a flow chart illustrating an operation of selecting cyclic data to be used.

FIG. 4 is a flow chart illustrating an operation of selecting cyclic data to be used.

This flow chart is based on the premise that an access restriction is applied to the MO disc or an access restriction is to be applied to the MO disc. First, it is determined whether an access target area is the security area or not (step S201). If the access target area is determined to be the user area, a first cyclic data in which the data shown in Table 1 is repeated is used (step S202). On the other hand, if the access target area is determined to be the security area, a second cyclic data in which data shown in Table 2 below is repeated is used (step S203).

TABLE 2

|  | bit7 | bit6 | bit5 | bit4 | bit3 | bit2 | bit1 | bit0 |
|---|---|---|---|---|---|---|---|---|
| byte1 | S0 | S1 | L | T0 | T1 | T2 | T3 | T4 |
| byte2 | *S0 | *S1 | L | *T0 | *T1 | *T2 | *T3 | *T4 |
| byte3 | S2 | S3 | L | T5 | T6 | T7 | T8 | T9 |
| byte4 | *S2 | *S3 | L | *T5 | *T6 | *T7 | *T8 | *T9 |
| byte5 | S4 | S5 | L | T10 | T11 | T12 | T13 | T14 |

The data shown in Table 2 is 5-byte data as with the data shown in Table 1 and is composed of bit data representing a track number, bit data representing a sector number and a discrimination bit discriminating between the land and the groove. The definition of the data shown in Table 2 is completely different from the definition of the data shown in Table 1.

Since either of the two types of cyclic data is selected for use as described above, the information recorded in the security area becomes difficult to be read illegally, and thus, the security is enhanced.

For further improvement of security, cyclic data based on the security information may be effectively used.

TABLE 3

|  | bit7 | bit6 | bit5 | bit4 | bit3 | bit2 | bit1 | bit0 |
|---|---|---|---|---|---|---|---|---|
| byte1 | S0 | L | T0 | P00 | P01 | T1 | T2 | T3 |
| byte2 | S1 | L | *T0 | P10 | P11 | *T1 | *T2 | *T3 |
| byte3 | S2 | L | T4 | P20 | P21 | T5 | T6 | T7 |
| byte4 | S3 | L | *T4 | P30 | P31 | *T5 | *T6 | *T7 |
| byte5 | S4 | L | T8 | P40 | P41 | T9 | T10 | T11 |

Table 3 shows an example of data which is a unit of the cyclic data based on the security information. This data is to be used in place of the data shown in Tables 1 and 2.

The data shown in Table 3 also contains bit data, such as "S4" and "T8", which are defined based on the bit data representing a track number, the bit data representing a sector number and the like. In addition, the data shown in Table 3 contains bit data represented by a combination of a symbol "P" and a number "m". This bit data denotes an m-th bit in bit data representing a password.

In this way, since the scrambling data contains a bit section defined based on the password or the like, different scrambling cyclic data is used for each user. Thus, it is extremely difficult for a person who tries illegal access without knowing the password to analyze the mark pattern formed on the MO disc and read the information without the password, and therefore, an extremely high security level is achieved.

When the information recorded in the security area using the data shown in Table 3 is to be reproduced, the password entered by the user or the like is used to create scrambling data and the information in the security area is read by the optical information storing device, and the password or the like is checked to determine whether to permit the access or not. Thus, checking of the password or the like is duplexed.

In the embodiment described above, the magneto-optical disc designed for optical recording is used as an example of the information storage medium according to the present invention. However, the information storage medium according to the present invention may be any magneto-optical disc designed for various recording schemes, such as magneto-optical recording or magnetic recording, or an optical disc designed for phase change recording or the like. Furthermore, the information storage medium according to the present invention is not limited to the disc-shaped storage medium and may be a card-shaped storage medium.

As described above, the optical information storing device according to the present invention is implemented with reduced cross talk and at a reduced cost. Furthermore, the data processing circuit according to the present invention enables such an optical information storing device to be implemented. Furthermore, in the information recording medium according to the present invention, occurrence of cross talk is reduced.

By implementing the present invention in this way, information can be stored with a higher recording density.

What is claimed is:

1. An optical information storing device, comprising:
   a data recording section that receives arbitrary recording data and records the recording data in a predetermined information storage medium in the form of optically-readable marks;
   a cyclic data output section that outputs predetermined cyclic data in which values are repeated every N bytes (N being an integer larger than 3, except for multiples of 3); and
   a logic operation section that receives the cyclic data output from the cyclic data output section and arbitrary original data, performs a predetermined logic operation on the cyclic data and the original data and inputs data resulting from the logic operation to the data recording section as the recording data.

2. The optical information storing device according to claim 1, wherein the logic operation section uses the exclusive-OR as the logic operation.

3. An optical information storing device, comprising:
   a data reading section that reads data recorded in a predetermined information storage medium in the form of optically-readable marks;
   a cyclic data output section that outputs predetermined cyclic data in which values are repeated every N bytes (N being an integer larger than 3, except for multiples of 3); and
   an inverse operation section that performs an inverse operation of a predetermined logic operation on the data read by the data reading section and the cyclic data output from the cyclic data output section and outputs data resulting from the inverse operation.

4. The optical information storing device according to claim 3, wherein the inverse operation section uses the exclusive-OR as the inverse operation.

5. The optical information storing device according to claim 1 or 3, wherein the cyclic data output section outputs predetermined cyclic data in which values are repeated every 5 bytes.

6. The optical information storing device according to claim 1 or 3, wherein the cyclic data output section has a register that stores N bytes of data which are a unit of the cyclic data and a cyclic data generator that generates the cyclic data repeatedly using the N bytes of data stored in the register.

7. The optical information storing device according to claim 1 or 3, wherein the predetermined information storage medium is a medium having plural tracks in which the marks are to be recorded arranged in parallel with each other, and the cyclic data output section outputs different cyclic data for each track.

8. The optical information storing device according to claim 1 or 3, wherein the predetermined information storage medium is a medium having plural tracks in which the marks are to be recorded arranged in parallel with each other, the tracks being each divided into plural sectors, and
the cyclic data output section outputs different cyclic data for each sector.

9. The optical information storing device according to claim 1 or 3, wherein the predetermined information storage medium is a medium having plural tracks in which the marks are to be recorded arranged in parallel with each other, the plural tracks being assigned respective track numbers for discriminating among the tracks, and
the cyclic data output section generates the cyclic data based on bit values of predetermined bits including a least significant bit in bit data representing the track number and outputs the cyclic data.

10. The optical information storing device according to claim 1 or 3, wherein the predetermined information storage medium is a medium having plural tracks in which the marks are to be recorded arranged in parallel with each other, the plural tracks being each divided into plural sectors, the plural tracks being assigned respective track numbers for discriminating among the tracks, the plural sectors being assigned respective sector numbers for discriminating among the sectors, and
the cyclic data output section generates the cyclic data based on bit values of predetermined bits including a least significant bit in bit data representing the track number and bit values of predetermined bits including a least significant bit in bit data representing the sector number and outputs the cyclic data.

11. The optical information storing device according to claim 1, further comprising: a nullifying section that nullifies the logic operation by the logic operation section when performing a read/write test of the marks for the predetermined information storage medium.

12. The optical information storing device according to claim 3, further comprising: a nullifying section that nullifies the inverse operation by the inverse operation section when performing a read/write test of the marks for the predetermined information storage medium.

13. The optical information storing device according to claim 1, further comprising: a nullifying section that nullifies the logic operation by the logic operation section when performing a failure check for the predetermined information storage medium.

14. The optical information storing device according to claim 3, further comprising: a nullifying section that nullifies the inverse operation by the inverse operation section when performing a failure check for the predetermined information storage medium.

15. The optical information storing device according to claim 1 or 3, wherein the predetermined information storage medium has a security area in which security information is recorded and an ordinary area in which ordinary information excluding the security information is recorded, and
the cyclic data output section outputs different cyclic data for the security area and the ordinary area.

16. The optical information storing device according to claim 1 or 3, wherein the cyclic data output section generates the cyclic data based on a data value of a predetermined bit in security bit data and outputs the cyclic data.

17. A data processing circuit that is incorporated in an optical information storing device and performs data processing, the optical information storing device having a data recording section that receives arbitrary recording data and records the recording data in a predetermined information storage medium in the form of optically-readable marks, the data processing circuit comprising:
a cyclic data output section that outputs predetermined cyclic data in which values are repeated every N bytes (N being an integer larger than 3, except for multiples of 3); and
a logic operation section that receives the cyclic data output from the cyclic data output section and arbitrary original data, performs a predetermined logic operation on the cyclic data and the original data and inputs data resulting from the logic operation to the data recording section as the recording data.

18. A data processing circuit that is incorporated in an optical information storing device and performs data processing, the optical information storing device having a data reading section that reads data recorded in a predetermined information storage medium in the form of optically-readable marks, the data processing circuit comprising:
a cyclic data output section that outputs predetermined cyclic data in which values are repeated every N bytes (N being an integer larger than 3, except for multiples of 3); and
an inverse operation section that performs an inverse operation of a predetermined logic operation on the data read by the data reading section and the cyclic data output from the cyclic data output section and outputs data resulting from the inverse operation.

19. An information storage medium in which information is recorded therein in the form of optically-readable marks, wherein data resulting from a predetermined logic operation performed on digital data representing the information and predetermined cyclic data in which values are repeated every N bytes (N being an integer larger than 3, except for multiples of 3) is converted into a mark and recorded.

* * * * *